(12) United States Patent
Phillips, III et al.

(10) Patent No.: US 9,255,998 B2
(45) Date of Patent: Feb. 9, 2016

(54) METHOD OF OPTIMIZING SEISMIC VIBRATOR OUTPUT FORCE

(71) Applicant: INOVA, LTD., Grand Cayman (KY)

(72) Inventors: Thomas F. Phillips, III, Richmond, TX (US); Russ Jay Ewert, Friendswood, TX (US)

(73) Assignee: INOVA LTD., Houston, TX (US)

( * ) Notice: Subject to any disclaimer, the term of this patent is extended or adjusted under 35 U.S.C. 154(b) by 0 days.

(21) Appl. No.: 14/154,331

(22) Filed: Jan. 14, 2014

(65) Prior Publication Data

US 2014/0196976 A1 Jul. 17, 2014

Related U.S. Application Data

(60) Provisional application No. 61/752,166, filed on Jan. 14, 2013.

(51) Int. Cl.
*G01V 1/04* (2006.01)
*G01V 1/145* (2006.01)
*G01V 1/00* (2006.01)
*G01V 1/09* (2006.01)

(52) U.S. Cl.
CPC *G01V 1/003* (2013.01); *G01V 1/09* (2013.01); *G01V 1/04* (2013.01); *G01V 1/145* (2013.01)

(58) Field of Classification Search
CPC ......... G01V 1/005; G01V 1/143; G01V 1/04; G01V 1/145
USPC .................................. 367/189, 190; 181/114
See application file for complete search history.

(56) References Cited

U.S. PATENT DOCUMENTS

| | | | | |
|---|---|---|---|---|
| 3,929,206 A | * | 12/1975 | Bedenbender et al. | 181/114 |
| 4,011,923 A | * | 3/1977 | Talke et al. | 181/114 |
| 4,116,300 A | | 9/1978 | Stone | |
| 4,316,521 A | * | 2/1982 | Chelminski | 181/114 |
| 4,683,558 A | | 7/1987 | Karner | |
| 4,855,967 A | * | 8/1989 | Sallas et al. | 367/190 |
| 4,867,096 A | | 9/1989 | Cole | |
| 7,292,943 B2 | | 11/2007 | Elder et al. | |
| 2008/0080312 A1 | | 4/2008 | Eperjesi et al. | |
| 2010/0195438 A1 | | 8/2010 | Goujon | |
| 2012/0271551 A1 | | 10/2012 | Wei et al. | |

OTHER PUBLICATIONS

PCT/US2014/011460—International Search Report dated May 12, 2014.

* cited by examiner

*Primary Examiner* — Ian J Lobo
(74) *Attorney, Agent, or Firm* — Mossman, Kumar & Tyler, PC

(57) ABSTRACT

A method of controlling a seismic vehicle may include estimating at least one orientation parameter for the seismic vehicle and controlling at least one operating parameter in view of the estimated orientation parameter(s). In non-limiting arrangements, the control may relate to re-positioning the seismic vehicle, adjusting value of a hold-down force or target drive force, and/or updating a seismic data acquisition database.

12 Claims, 9 Drawing Sheets

METHOD OF OPTIMIZING SEISMIC VIBRATOR OUTPUT FORCE

CROSS REFERENCE TO RELATED APPLICATIONS

This application claims priority from U.S. Provisional Application Ser. No. 61/752,166 filed Jan. 14, 2013, the disclosure of which is incorporated herein by reference.

BACKGROUND OF THE DISCLOSURE

1. Field of the Disclosure

The present disclosure generally relates to seismic prospecting and in particular to methods and apparatus for conducting seismic surveys.

2. Description of the Related Art

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 300 Hz. The vibrator imparts a signal into the subsurface of the earth over a relatively long period of time, which allows for an energy level less than an impulse generator such as dynamite. In some applications, a seismic vibrator may also be used as a surface impulse source.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface. The seismic vibrator source signal is typically a sweep signal, or simply sweep.

Conventionally, the vehicle weight provides an assumed static force load that maintains continuous contact between the base plate and the underlying earth. If the static force, or "hold-down" force, is insufficient, then the base plate may decouple from the earth, which may lead to signal to noise level degradation. If the static force exceeds the effective vehicle weight, then the vehicle may become unstable.

The present disclosure provides methods and devices for improving seismic sweeps by compensating for factors affecting the magnitude of the hold-down pressure applied to the base plate.

SUMMARY OF THE DISCLOSURE

In aspects, the present disclosure provides a method of controlling a seismic vehicle. The method may include determining a range of values for at least one orientation parameter for the seismic vehicle, positioning the seismic vehicle at a location in a geographical area of interest, measuring the at least one orientation parameter of the seismic vehicle, and imparting seismic energy into a subsurface formation using the seismic vehicle only if the measured at least one orientation parameter is within the determined range of values for the at least one orientation parameter.

In another aspect, the present disclosure provides a method of controlling a seismic vehicle that may include positioning the seismic vehicle at a location in a geographical area of interest, measuring at least one orientation parameter of the seismic vehicle, and selecting a value of a hold-down force based on the measured at least one orientation parameter.

In still another aspect, the present disclosure provides a method that includes transmitting seismic vehicle information from the seismic vehicle to a control center, wherein the seismic vehicle information includes at least one of: (i) at least one orientation parameter, and (ii) the selected value of the hold-down force, and updating a seismic data acquisition database at the control center using the transmitted seismic vehicle information.

In still another aspect, the present disclosure provides a method of performing a seismic survey that includes imparting seismic energy into a subsurface formation using a seismic vehicle, detecting seismic signals using at least one sensor, wherein the seismic signals are reflections of the imparted seismic energy, and characterizing the subsurface formation using the detected seismic signals and at least one of: (i) an orientation parameter associated with the seismic vehicle, and (ii) a hold-down force applied by the seismic vehicle while the seismic energy was imparted.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

As will be appreciated from the discussion below, aspects of the present disclosure provide methods and systems for minimizing risk that the "hold-down" force used to maintain continuous contact between a base plate and the underlying earth does not inadvertently destabilize a seismic vehicle. The methods and systems of the present disclosure may be used to identify situations that may affect the desired value for hold-down pressure, compensate for situations that may affect the desired value for hold-down pressure, and quantify the effect of such situations on the acquired seismic information. Predominantly, these situations arise when the land surface has an angle (e.g., slope or incline) that varies the orientation of a seismic vehicle. The orientation may relate to tilt, roll, or azimuth.

Merely for brevity, aspects of the present disclosure will be discussed in connection with a system that uses a vehicle-mounted surface source. One illustrative vehicle-mounted surface source is a vibrator vehicle. Vibrator vehicles support a heavy base plate that is connected to an inertia mass. The inertia mass contains a linear actuator that reciprocates the base plate along a vertical or horizontal axis in reaction to the momentum of the inertia mass. The reciprocating base plate injects a vibratory wave train into the earth. However, the teachings of the present disclosure may also be used with surface impulse source vehicles. One illustrative impulse energy source is an accelerated weight-drop vehicle. A weight-drop vehicle is a vehicle mounted ground impact which can used to provide the seismic source. A heavy weight is raised by a hoist at the back of the vehicle and dropped, possibly about three meters, to impact (or "thump") the ground. To augment the signal, the weight may be dropped more than once at the same spot, the signal may also be increased by thumping at several nearby places in an array whose dimensions may be chosen to enhance the seismic signal by spatial filtering. It should be understood, therefore, that any device that generates usable seismic energy may be an energy source. Further, any vehicle-mounted surface source may incorporate the present teachings.

Figure 1:
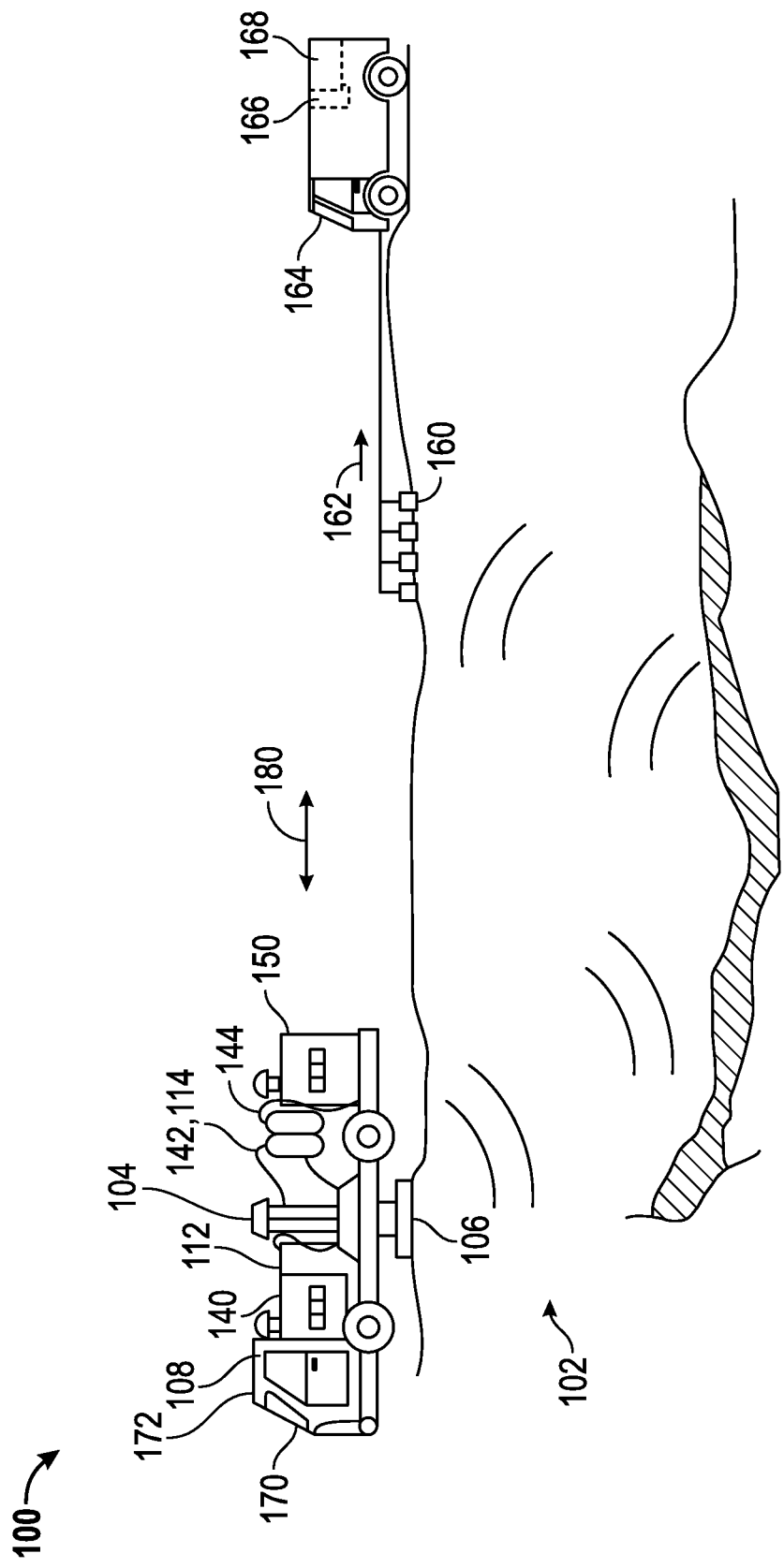
FIG. 1 illustrates a typical seismic data acquisition operation utilizing aspects of the present disclosure.

FIG. 1 depicts a geophysical survey layout for generating seismic information that may be used to characterize a subsurface formation. A seismic source 100 is positioned at a predetermined location in an area of exploration and coupled to the earth. In the embodiment shown the seismic source 100 is a vehicle-carried vibratory seismic source. The vibratory seismic source 100 may be a single axis source imparting, for example, only compression P-waves into the earth. Those skilled in the art would recognize that a multi-axis vibratory source capable of imparting both P and S waves into the earth can be configured according to the present disclosure described in detail herein below without additional illustration or description. Therefore, the present disclosure will focus on a single axis seismic source for brevity and without limiting the scope of the disclosure.

The seismic source 100 includes a seismic vehicle, or simply, "vehicle" 170 having a cab 172 housing a controller 108. The seismic source includes a hydraulic subsystem 140 used to move a reaction mass 104. As will be described in more detail in reference to FIG. 2, the moving reaction mass 104 acts upon a base plate 106 to impart a seismic source signal 102 into the earth. The signal 102 travels through the earth, reflects at discontinuities and formations, and travels toward the earth's surface.

A plurality of sensors 160 are coupled to the earth in an array spaced apart from the seismic source 100. The sensors 160 detect the reflected source signal 102, and electrical signals 162, which may be digital and/or analog, are transmitted from the array of sensors 160 to a recording station (not shown) typically housed in a vehicle. The recording station includes a seismic recorder 168 and may also include a correlation processor, which also receives an electrical signal 180 indicative of the actual source signal 102 imparted into the earth.

Still referring to FIG. 1, the seismic source 100 comprises several subsystems having system components used in generating the seismic signal 102. The system 100 includes a hydraulic pump subsystem 140 having hydraulic lines 142 carrying hydraulic fluid 114 to a servo valve assembly 112. A cooler 150 is typically present to cool the hydraulic subsystem. Low frequency accumulators 144 mounted on the vehicle are relatively large, e.g. about ten gallons or more, and serve to dampen low frequency noise, e.g. about 25 Hz or less, caused by operation of the hydraulic system.

Figure 2:
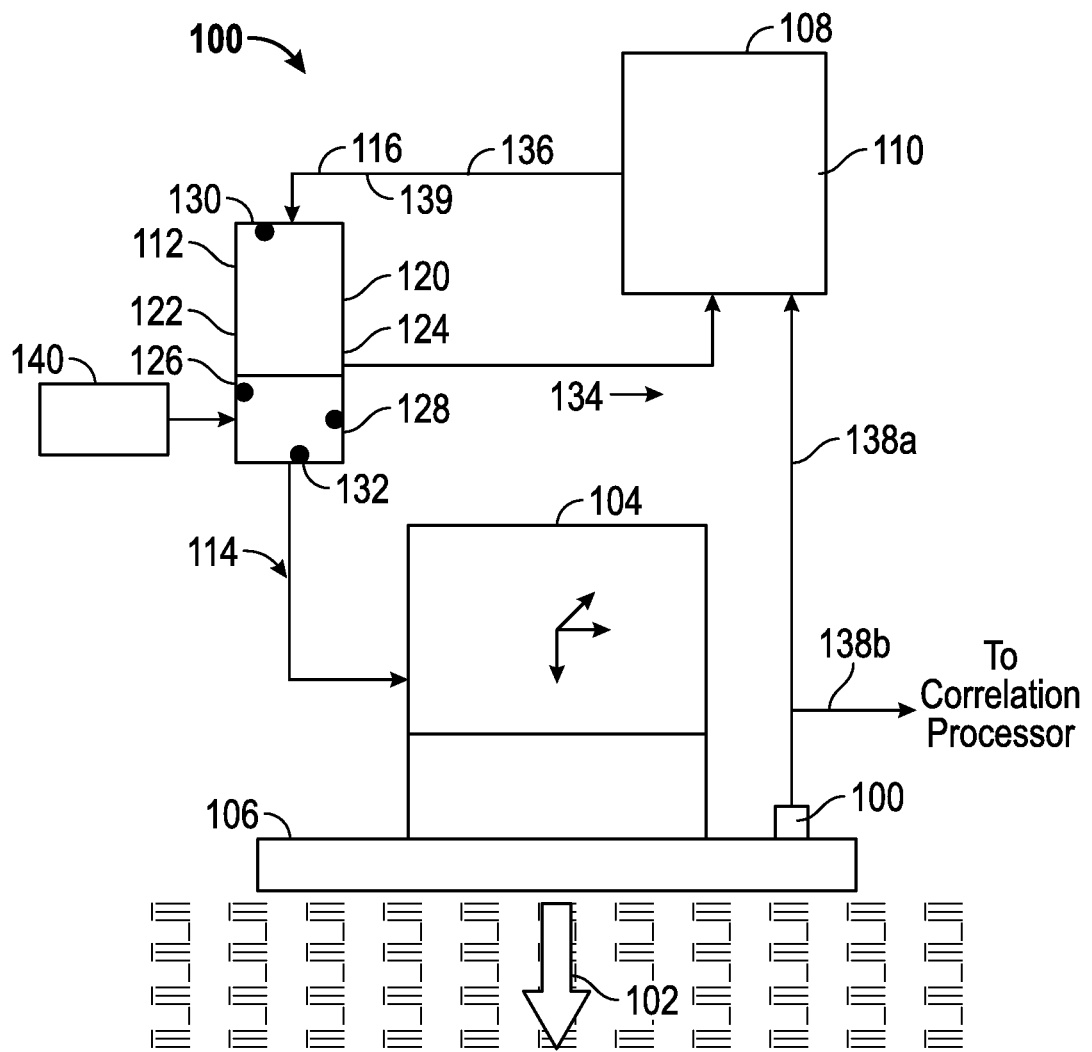
FIG. 2 is a schematic representation of functional features of a vibratory seismic source such as the source of FIG. 1.

FIG. 2 schematically illustrates a seismic signal generating system 100 substantially as described above and shown in FIG. 1 for imparting a sinusoidal seismic signal 102 into the earth. The signal may be of any desired shape or type; e.g., sinusoidal, impulse, or pseudo-random, etc. Reference numerals are aligned with the like components of FIG. 1. The base plate 106 is coupled via static weight to the earth. The reaction mass 104 is movably coupled to the base plate 106 such that controlled movement of the reaction mass 104 via the hydraulic subsystem 140 vibrates the base plate 106 at a desired amplitude and frequency or sweep to generate the signal 102. The controller 108 includes a processor 110 for controlling the system 100. The controller is electrically coupled to the servo valve assembly 112. The servo valve assembly 112 includes a servo motor 120, a pilot valve 122 and a main stage valve 124.

The servo valve assembly 112 controls fluid movement in the hydraulic subsystem 140, which provides a force for moving the reaction mass 104. An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages (not shown) to move the reaction mass 104 according to the controller signal.

Figure 3:
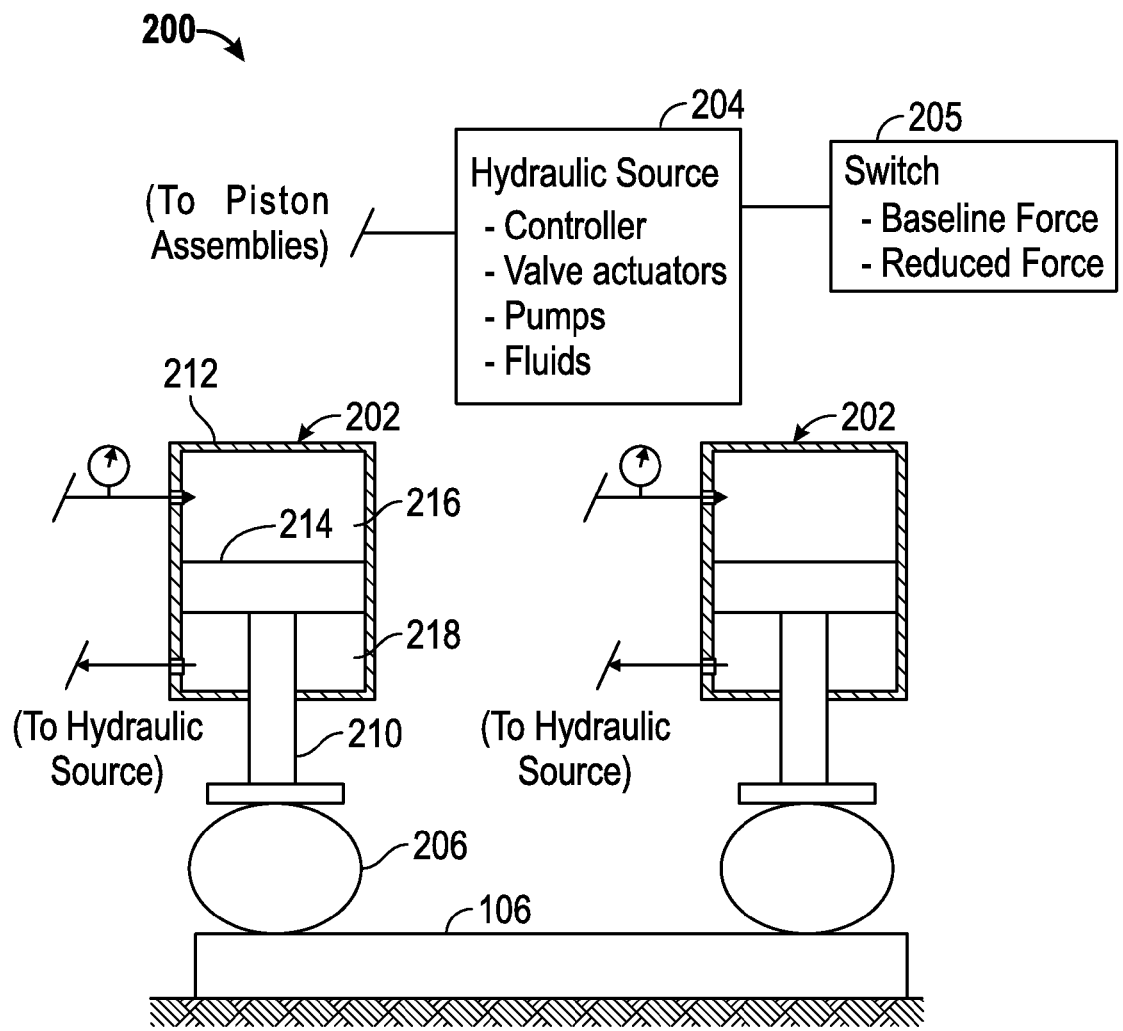
FIG. 3 illustrates a system for generating a hold-down force in accordance with one embodiment of the present disclosure.

Referring now to FIG. 3, there is schematically illustrated a hold-down system 200 that applies a hold-down force to the base plate 106 while the reaction mass 104 (FIG. 2) vibrates the base plate 106. The hold-down system 200 includes a plurality of piston assemblies 202 that are energized by a hydraulic source 204. The hydraulic source may include known components such as a programmable controller, valves, valve actuators, pumps, and fluid reservoirs that are used to circulate pressurized hydraulic fluid to the piston assemblies 202. The piston assemblies 202 are mechanically coupled to the base plate 106 with isolators 206. The isolators 206 may be airbags or other pliant bodies that transfer normal forces from the piston assemblies 202 to the base plate 106 but isolate the piston assemblies 202 from the motion of the base plate 106. The piston assemblies 202 are also mechanically coupled to a chassis (not shown) of the vehicle 170. This mechanical coupling transfers the weight of the vehicle 170 to the piston assemblies 202.

Conventionally, the piston assemblies 202 may include a piston 210 that reciprocates in a cylinder 212. The piston 210 includes a head 214 that separates the interior of the cylinder 212 into an upper chamber 216 and a lower chamber 218. To generate a hold-down force, the hydraulic source 200 pumps hydraulic fluid into the upper chamber 216. The pressure of the hydraulic fluid acts on the face of the piston head 214 according to the known equation Force=fluid pressure×Area of Piston Face. The fluid pressure drives the piston 210 downward against the isolators 206, which then apply the force to the base plate 106. Generally, the weight of the vehicle 170 opposes the generated force and allows the cylinder 212 to remain stationary while the piston 210 moves downward. As long as the weight of the vehicle 170 is at least as great as the hold-down forces applied by the piston assemblies 200, the vehicle 170 remains stable. As used herein, the term 'hold-down force' refers to the combined or resultant force generated by the piston assemblies 202.

However, the orientation (e.g., tilt, roll, and yaw) of the vehicle 170 can affect the amount of vehicle weight that is available to counter the applied hold-down force(s). For convenience, the available weight to counter the applied hold-down force will be referred to as the "effective" weight. If the applied hold-down force exceeds the effective weight of the vehicle 170, then the cylinder 212 and the vehicle 170 may become physically unstable. For example, the applied hold-down force may lift a portion of the vehicle 170 off the ground.

Figure 4:
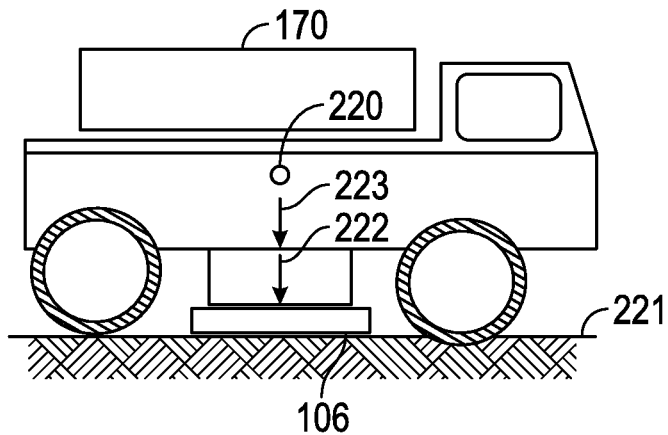
FIG. 4 illustrates the forces associated with a seismic vehicle.

Referring now to FIG. 4, there is diagrammatically shown a vehicle 170 positioned on a horizontal surface 221 and that has a center of gravity (CoG) 220. The body of the vehicle 170 and the base plate 106 are arranged such that the CoG 220 may be aligned with a hold-down force 222 generated by the piston assemblies 202 (FIG. 3). This alignment need not be exact. In this situation, the normal force 223 associated with the weight of the vehicle 170 and the orientation of the surface 221 are known. Therefore, the hydraulic source 204 (FIG. 3) can be pre-configured to generate a force 222 that is no greater than the normal force 223 of the vehicle 170. Because the force 222 cannot lift the vehicle 170, the vehicle 170 is in a stable condition while the hold-down force 222 is applied to the base plate 106.

Figure 5:
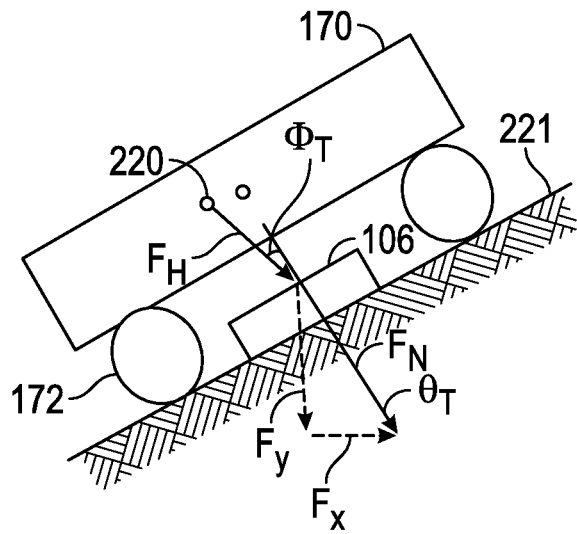
FIG. 5 illustrates the forces associated with a seismic vehicle having a tilt angle due to a sloped surface.

Referring now to FIG. 5, there is shown a vehicle 170 on an inclined surface 221. By inclined, it is meant the surface has an angle relative to a horizontal plane. Specifically, the surface 221 has a tilt (or pitch) angle $\theta_T$. The tilt angle $\theta_T$ creates a misalignment between the CoG 220 and a hold-down force vector $F_H$, which reduces the effective weight that opposes the hold-down force $F_H$. The effective hold-down force $F_{ET}$ required when a tilt condition reduces the effective weight may be calculated as follows:

$F_H$=hold-down force from the lift cylinders $F_{HN}$=hold-down force from the lift cylinders normal to the surface plane Let $F_N = F_{HN}$ $F_y$=Y-axis component of $F_N$ $F_x$=X-axis component of $F_N$ $\Phi_T$=angle of CoG tilt $\theta_T$=angle of level surface to force that is normal to surface plane Thus $F_{HN} = F_H \times \cos \Phi_T$ $F_N = F_{HN}$ $F_Y = F_H \times \cos \Phi_T \times \sin \theta_T$ $F_{ET} = F_Y$ Because $F_{ET}$ is necessarily lower than $F_H$ in a tilt condition, applying a hold-down force greater than the effective hold-down force, $F_{ET}$, may rotate the vehicle about the lower wheels 172.

Figure 6:
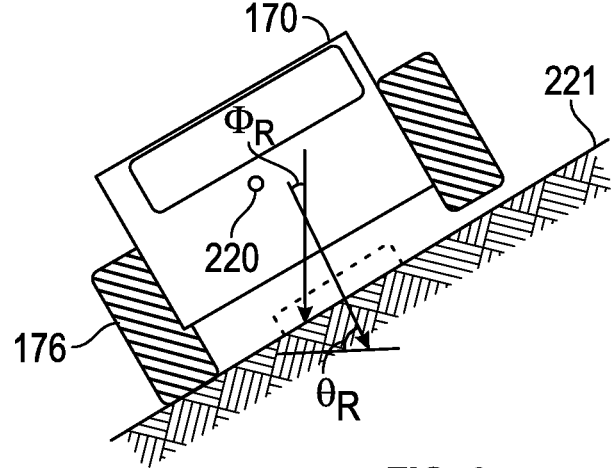
FIG. 6 illustrates the forces associated with a seismic vehicle having a roll angle due to a sloped surface.

A similar affect arises with the presence of a roll angle on a surface. Referring now to FIG. 6, the vehicle 170 is shown on a surface 221 that has a roll angle $\theta_R$. The effective hold-down force, $F_{ER}$, may be calculated as follows:

$F_{ER}$=effective hold-down force due to roll $F_H$=hold-down force from the lift cylinders Let $F_N = F_{HN}$ $F_y$=Y-axis component of $F_N$ $F_x$=X-axis component of $F_N$ $\Phi_R$=angle of CoG roll $\theta_R$=angle of level surface to force that is normal to surface plane Thus $F_{HN} = F_H \times \cos \Phi_r$ $F_N = F_{HN}$ $F_Y = F_H \times \cos \Phi_R \times \sin \theta_R$ $F_{ER} = F_Y$ As in the case with tilt, applying a hold-down force greater than the effective hold-down force, $F_{ER}$, may rotate the vehicle about the lower wheels 176. Thus, the presence of a roll angle on a surface may also reduce the amount of maximum hold-down force that can be applied without destabilizing the vehicle 170.

By way of example, a vehicle may have an effective weight of 60,000 lbf ($F_H$) on a perfectly horizontal surface. The effective weight on an inclined surface having a $\Phi_T$=2°, $\theta_T$=80°, $\Phi_R$=1°, $\theta_R$=85° may be determined using the above equations as follows.

$F_{ET} = F_H \times \cos \Phi_T \times \sin \theta_T = 59{,}052$ lbf $F_{ER} = F_H \times \cos \Phi_R \times \sin \theta_R = 59{,}762$ lbf $F_E = F_H - (F_H - F_{ET}) - (F_H - F_{ER})$ $F_E = 58{,}814$ lbf Thus, under these conditions, applying a hold-down force in excess of 58,814 lbf may impair operation of the vehicle 170. For example, the baseplate may decouple from the earth surface and cause the generation of a poor signal.

Figure 7:
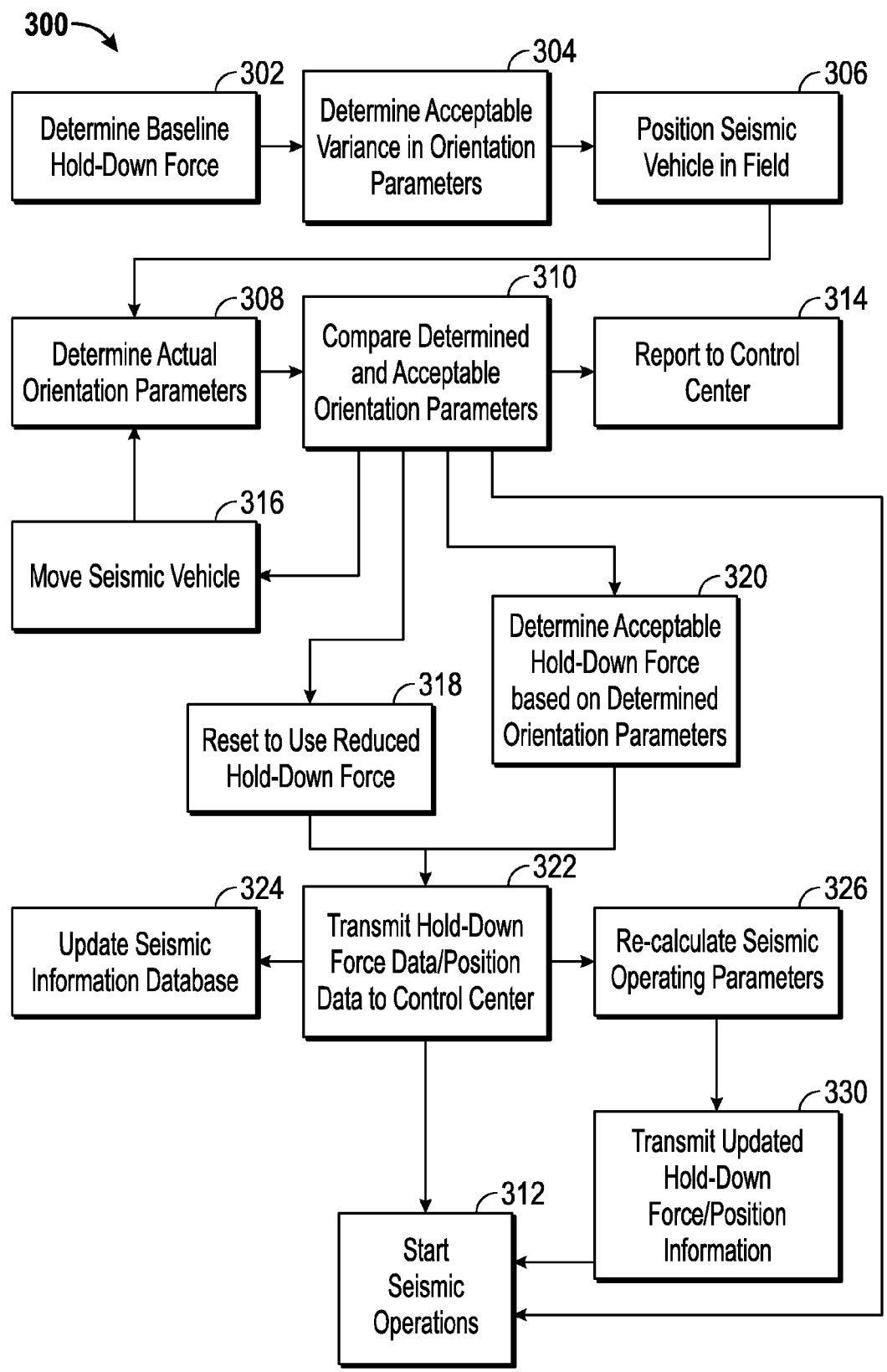
FIG. 7 illustrates a flow chart of methods for managing seismic vehicles in accordance with several embodiment of the present disclosure.

As discussed below, methods and systems of the present disclosure account for inclined or sloped surfaces in terrain where seismic vehicles may be deployed. Referring now to FIG. 7, there is illustrated a flow chart 300 that depicts a variety of methods for managing the effect of sloped surfaces on the operation of seismic vehicles. For brevity, the flow chart 300 includes a number of steps. However, as explained below, some of these steps are optional or alternative steps. Thus, suitable methods may include fewer than all the identified steps. For ease of explanation, the method of FIG. 7 will be discussed in conjunction with FIG. 8, which depicts a fleet of vehicles 170 that communicate with a central control 250 during seismic data acquisition operations.

The method 300 begins at step 302, which determines a baseline hold-down force. That is, the baseline hold-down force represents the maximum hold-down force for one or more vehicles 170 (FIG. 8) is analytically and/empirically determined relative to a surface that has no tilt or roll angle, or a "flat" surface. At step 304, a maximum value for variations in orientation parameters such as tilt and roll may be established. For instance, acceptable tilt angles may range from zero degrees to five degrees and acceptable roll angles may range from zero degrees to seven degrees. At step 306, the vehicles 170 (FIG. 8) are driven to a desired locations in the field. At step 308, field personnel measure the actual orientation (e.g., tilt, roll, azimuth) of the vehicle 170 using orientation sensors 252. At step 310, personnel compare the measured orientation parameter values with the established acceptable ranges for these orientation parameters.

If the measured values are within the acceptable ranges, then the vehicle may initiate operation at step 312. This may include reporting to a command center 250 that the vehicle is ready to begin operation, commencing seismic operations, and/or transmitting the measured orientation parameters to the command center 250. The command center 250 may have bi-directional communication with the seismic vehicles 170, field crews, seismic receivers, etc and can direct both human and machine activity during seismic data acquisition operations. The command center 250 may include one or more processing devices that are programmed to manage one or more databases that can include information relating to seismic vehicle location, sweep information, detected seismic data, pre-processed seismic data and "quality control" (QC) data, which can include the actual coordinates of seismic sources and receivers. Even though the measured values are within acceptable ranges, the command center 250 may update the relevant database with this information for future use.

If the measured orientation parameters are outside of acceptable ranges, a number of corrective actions may be taken.

One set of actions may be initiated and controlled at least partially by the control center 250. For instance, at step 314, the vehicle 170 reports the determined orientation parameters to the central control station 250 for further instructions. Personnel at the control station 250 may evaluate the determined orientation parameters and transmit instructions to take measures that include: (i) operate as previously instructed, (i) not operate, (ii) move positions, and (iii) adjust the hold-down force.

Another set of measures may be initiated at the vehicles 170 in an autonomous or semi-autonomous fashion. For example, the vehicle may move to a different location, shown at step 316, and repeat step 308.

Still another set of corrective actions may involve reducing the hold-down force generated by the vehicle 170 at step 318. An arrangement for performing step 318 is shown in FIG. 3, which illustrates a hold-down force system 200 configured to generate two or more different preset hold-down forces. For example, the hydraulic source 204 may include a switch 205 that may be actuated to vary the applied hold-down force between a baseline hold-down force and a second reduced hold-down force (e.g., twenty percent lower than the baseline hold-down force). In one arrangement, activating the switch 205 reduces the pressure and/or flow rate of the hydraulic fluid supplied to the piston assemblies 202 via a hold down pressure manifold (not shown) that has the ability to switch between two or more preset pressure settings. For example, a hold-down pressure manifold may include an electronically controlled pressure reducing valve that can be adjusted by an electrical or electronic device. In a simplified arrangement, the switch 205 may be programmed to provide two different hold-down forces. However, in other arrangements, three or more different-hold forces may used. In one embodiment, the switch 205 may be a user activated switch that is located in the cab of the seismic vehicle 170.

Figure 9:
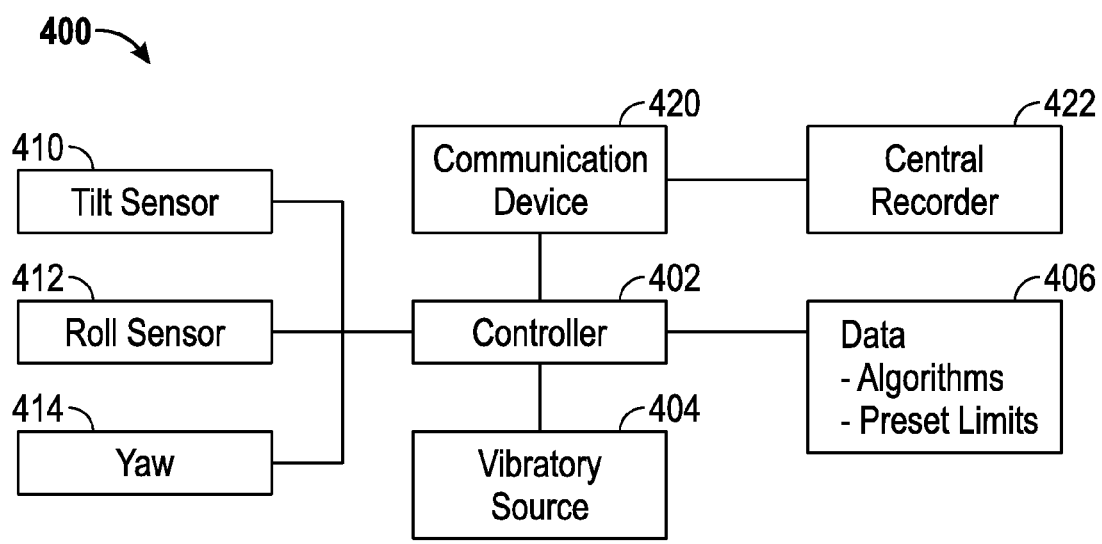
FIG. 9 schematically illustrates a system for adjusting a hold-down force in accordance with one embodiment of the present disclosure.

As an alternative to a preset value, the method may calculate an appropriate hold-down force in the field at step 320. An arrangement for performing step 320 is shown in FIG. 9, which shows an automated adjustable hold-down force system 400. The system 400 may include a programmable controller 402 and a vibratory source 404 for imparting seismic signals. In one non-limiting embodiment, the vibratory source 404 may be a hydraulic source that supplies pressurized fluid to the piston assemblies 202 (FIG. 3). The controller 402 may be a conventional processor that has resident on-board memory and circuitry for receiving data and executable algorithms 406. The controller may also receive signals from one or more orientation sensors 408. The orientation sensors 408 may include a tilt sensor 410, a roll sensor 412, and a yaw sensor 414. The controller 402 may be programmed to use the signals from one or more of the orientation sensors 408 to determine whether or not the orientation of the vehicle 170 (FIG. 3) is within acceptable ranges. If not within the acceptable ranges, the controller 402 may issue instructions that adjust the operating set-points of the vibratory source 404 to reduce the amount of applied hold-down force. Alternatively, the controller 402 may operate in a user-prompted mode by switching hold-down forces after a user actuates a switch or receiving information sent via radio in a communication message.

In one arrangement, the controller 402 may instruct the vibratory source 404 to use a preset reduced hold-down force as previously described in connection with step 318. In another arrangement, the controller 402 may calculate the appropriate hold-down force based on the measured orientation of the vehicle 170 (FIG. 3) and programmed algorithms for calculating effective hold-down forces. Thereafter, the controller 402 may issue corresponding instructions to the vibratory source 404. In such an arrangement, the applied hold-down force is calculated during operation as opposed to being preset value. The controller 402 may also use a communication device 420 to transmit the measured orientation information and calculated hold-down force information to a central recorder 422.

Alternatively, an appropriate hold-down force may be calculated without using a predetermined range of values for orientation parameters. Referring to FIG. 9, the controller 402 may use preprogrammed information relating to the dimensions, configuration, weight, center of gravity, and operating characteristics of the seismic vehicle. The controller 402 may use this information along with the signals from the orientation sensors 408 to determine an acceptable hold-down force for the particular situation. Next, the controller 402 may issue instructions that adjust the operating set-points of the hydraulic source 402 to generate this determined acceptable hold-down force.

While the controller 402 of FIG. 9 is shown as a standalone device, the FIG. 9 controller 402 may be integrated with the FIG. 2 controller 108. Also, the controller 402 may be co-located with the vehicle 170 or positioned at a remote location, such as the control center 250 (FIG. 8).

A further aspect of the present disclosure relates to updating data used during seismic data acquisition in view of changes in location and/or hold-down force resulting from the methods of FIG. 7. Referring to FIG. 8, the acoustical characteristics of the seismic energy generated by the vehicles 170 can be affected by the location of the vehicles 170 and the hold-down force applied while that seismic energy is generated. During the planning phase of a seismic data acquisition campaign, the location and hold-down force of the vehicle 170 are analytically determined. When the acquired seismic information is processed to characterize a subsurface formation, it is usually assumed that the analytical locations and hold-down forces are the same as the actual values for these parameters. Variations from assumed location and hold-down force may adversely impact the accuracy of the predictions based on the acquired seismic information.

Figure 8:
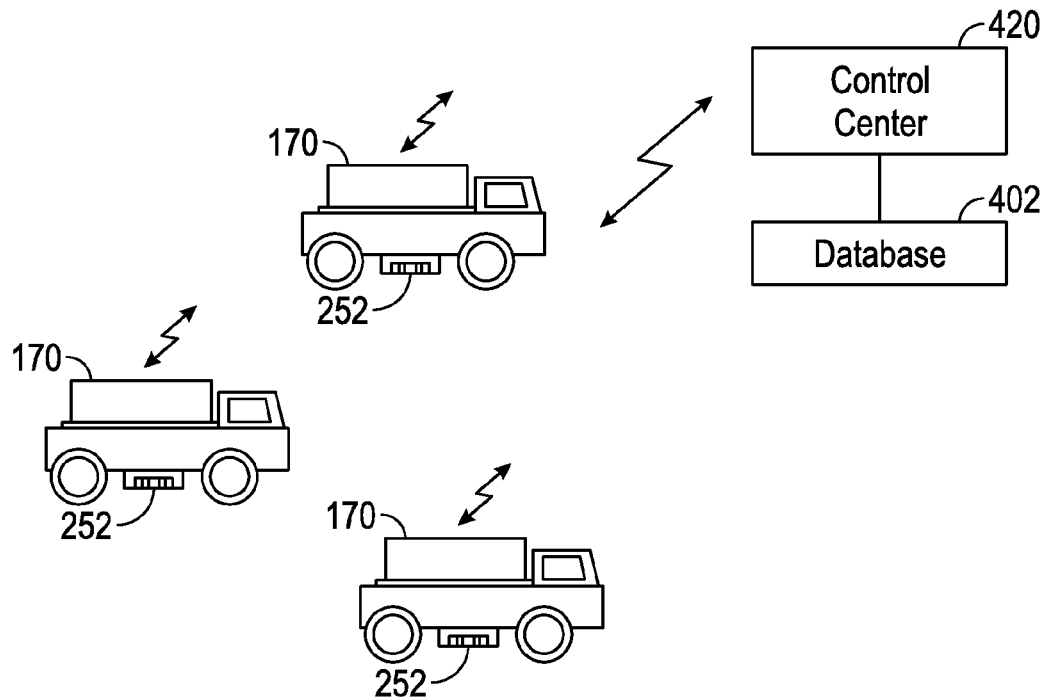
FIG. 8 illustrates a fleet of seismic vehicles and a control center in accordance with the present disclosure.

Thus, referring to FIG. 8, in additional embodiments, the vehicle crew may transmit revised location and/or hold-down forces to a control center at step 322. The communication can occur over wired media and/or wirelessly. The control center may update a seismic database with the revised information at step 324. In some embodiments, at step 326, the control center may evaluate the impact of the revised location and/or hold-down force for a particular vehicle on the remainder of the seismic vehicles. At step 330, the control center may instruct some or all of the remaining vehicles to make operational adjustments. For example, the control center may instruct the vehicles to adjust their hold-down forces and/or locations. Also, the control center may issue instructions to reset the target drive force levels or hold-down pressures for one or more vehicles in a fleet. The control center can transmit this information to the vibrator controllers to adjust either parameter.

The disclosure is not limited to any particular sequence or destinations for the transmitted orientation data (e.g., measurement of tilt and roll) and hold-down force. Generally speaking, the orientation measurements may be sent to a recording system located at the control center 250 (FIG. 8) or to a computer or logging device in, or near, the vibrator vehicle 170 (FIG. 8). Also, this data may be logged into the vibrator control electronics and retrieved at a later time. The transmission may occur before or after a sweep is performed and may use cable or cableless transmission media.

It should be understood that the FIG. 3 and FIG. 8 arrangements are directed to hydraulic systems that generate hold-down force. However, the present disclosure is not limited to only seismic vehicles or platforms that use hydraulic system. Rather, the teachings of the present disclosure may be equally applied to systems that use electrical, magnetic, or mechanical arrangements to generate hold-down forces. Also, as used above, the term hold-down force generally describes the force applied to the base plate. Particularly with hydraulic systems, the term hold-down force may be considered synonymous with the term "hold-down pressure" because pressure is a parameter that is often varied or controlled in order to control the applied hold-down force. Therefore, controlling "hold-down pressure" effectively controls "hold-down force." Instead of hydraulic pressure, a hold-down force system could be based on magnetic or electro-mechanical devices. In such systems, current or voltage may be the controlled parameter, and controlling "hold-down current" controls "hold-down force." For the purposes of the present disclosure, "a hold-down pressure" or "hold-down current" are encompassed by the term "hold-down force."

Figure 10:
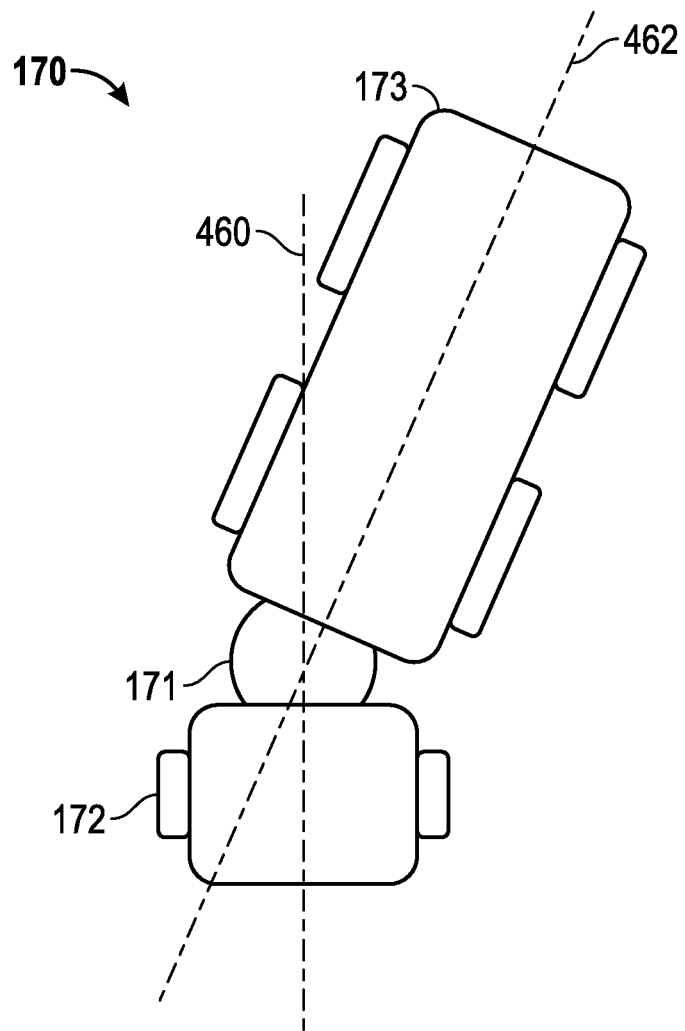
FIG. 10 schematically illustrates an articulated joint that may be used with a seismic source in accordance with one embodiment of the present disclosure.

Referring now to FIG. 10, there is shown a vehicle 170 that includes an articulated joint 171 connecting the cab 172 to a trailer 173 supporting the reaction mass and associated equipment. The articulated joint 171 may be used to steer the vehicle 170 by causing an angular offset between a long axis 460 of the cab 172 and a long axis 462 of the trailer 173. For convenience, this offset will be referred to as articulated joint offset. It should be appreciated that if the vehicle 170 is on a slope, then the angular offset will shift the COG of the vehicle 170. The magnitude and direction of this shift will depend on the amount of articulated joint offset and the degree of the slope (roll). In certain circumstances, this shift can affect the amount of vehicle weight that is available to counter the applied hold-down force(s). The methods discussed previously may be used to adjust operating parameter, if needed, to accommodate the effect of the CoG shift due to such articulated joint offset.

Figure 11A:
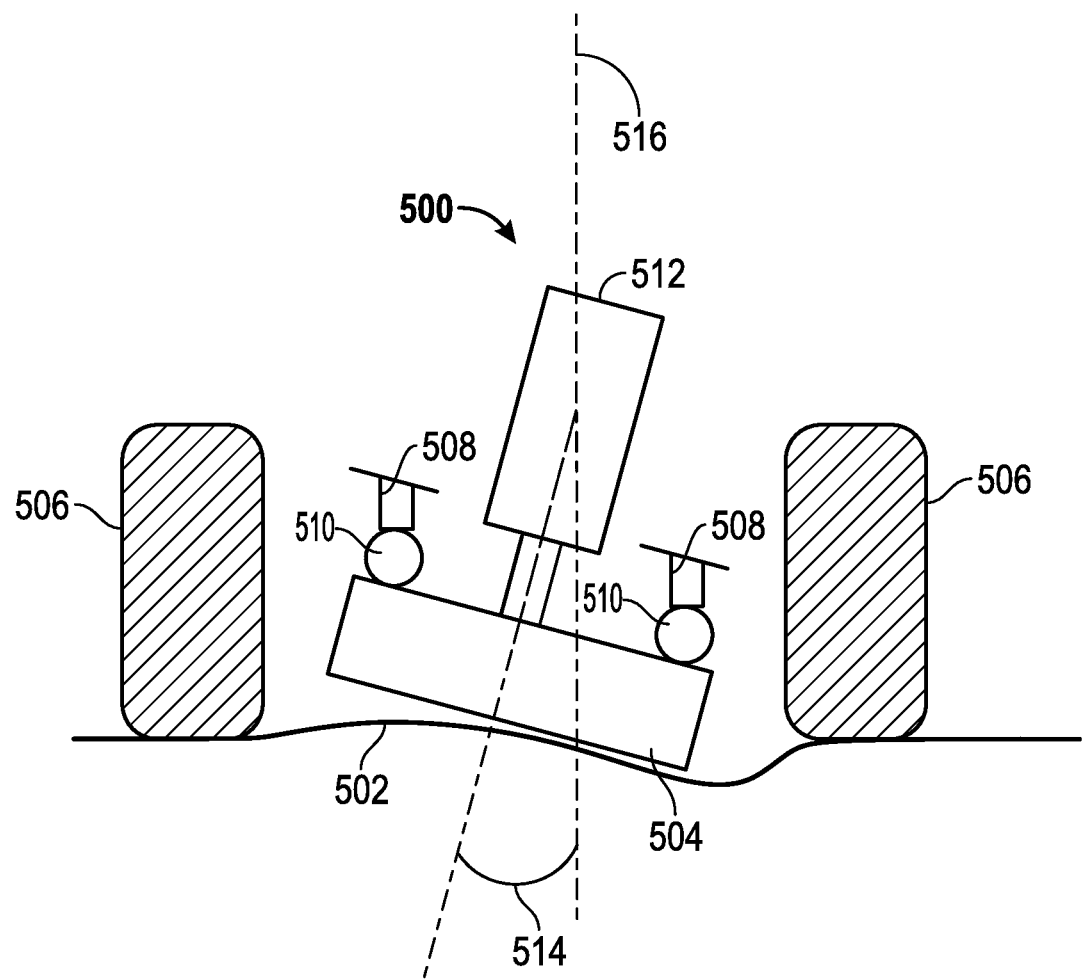
FIGS. 11A and 11B schematically illustrate systems wherein an uneven surface causes a maximum peak force in the vertical direction to be reduced.

Referring now to FIG. 11A, the present teachings may also be used to mitigate situations wherein a reaction mass is not aligned with a vertical datum and may not be able to produce the maximum peak force in the vertical direction. FIG. 11A, shows a vehicle 500 on uneven ground 502. It should be noted that the uneven ground 502 is positioned below the reaction plate 504, but the vehicle tires 506 are on substantially even ground. As the hold down force is applied via the lift cylinders 508 and air bags 510 to the reaction plate 504, the connected reaction mass 512 becomes misaligned 514 with the vertical datum 516. The vertical datum 514 is aligned with the direction of p-waves imparted into the earth. This situation can occur independent of or in addition to the conditions requiring an adjustment to hold down force adjustment. In one embodiment, the misalignment is estimated using orientation sensors and the target drive level may be lowered. Also, the seismic acquisition database may be revised to reflect the new lower max peak force. Also, hold-down force may be reduced and/or the other vehicles may be instructed to lower their hold-down forces. This could happen whether or not the vehicle is level and is an independent from the hold down pressure concept.

Figure 11B:
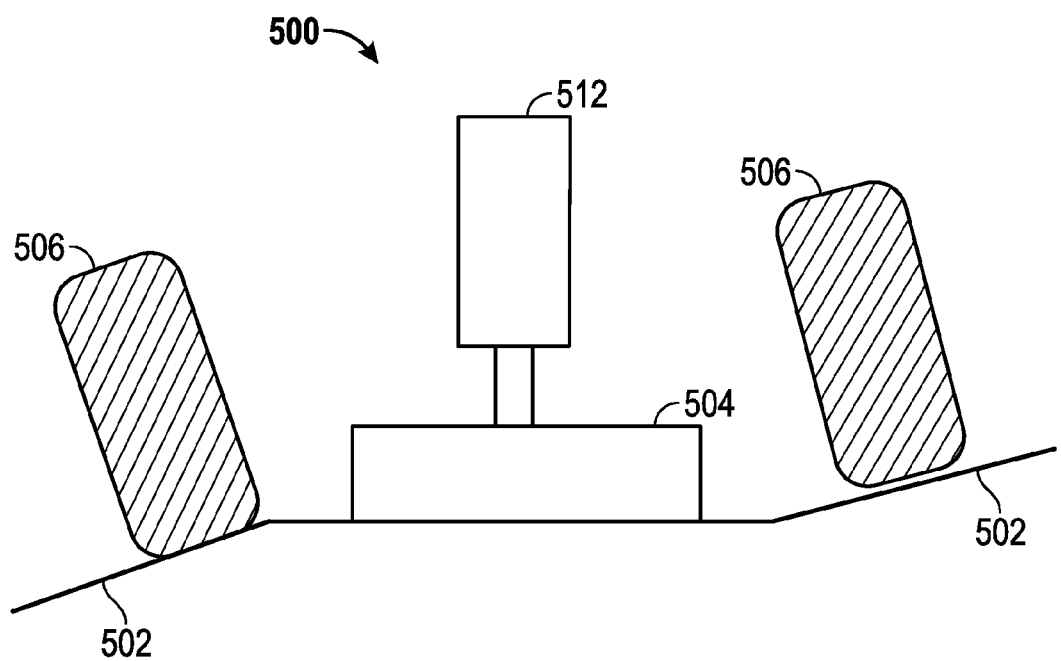

Referring now to FIG. 11B, there is shown a situation where the vehicle 500 is on uneven ground. In this situation, the vehicle tires 506 are on the uneven ground 502, but the reaction plate 504 is on substantially even ground. As the hold down force is applied via the lift cylinders 508 and air bags 510 to the reaction plate 504, the connected reaction mass 512 remains aligned the vertical datum 516. However, the amount of hold down force may be reduced.

In operating methods according to the present disclosure the target force ($F_{target}$) used during source operation may be selected based on a comparison between the selected peak force ($F_{peak}$) and expected hold down force ($F_{hold\ down}$). For example, the target force may be the lesser of either the selected peak force or the expected hold down force:

$$F_{target} = \min [F_{peak}, F_{hold\ down}]$$

As used above, the term "location" refers to the position of an object relative to a geographical reference frame (e.g., longitude and latitude). The term "orientation" refers to the position of a body relative to reference plane or reference axis. Thus, a body may be in one location but be positioned in different orientations. Also, a body may be positioned at different locations while having the same orientation. In the discussion above, orientation parameters have been described as including tilt (e.g., relative to a horizontal plane), roll (e.g., relative to a horizontal plane), and azimuth (i.e., heading relative to North). It should be understood that other reference systems may be used as orientation parameters.

Portions of the present disclosure pertaining to "software aspects" of the disclosure are used herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The invention claimed is:

1. A method of controlling a seismic vehicle, comprising:
    positioning the seismic vehicle at a location in a geographical area of interest;
    measuring at least two orientation parameters of the seismic vehicle, wherein the at least two orientation parameters include at least two of: (i) tilt, (ii) roll, and (iii) azimuth;
    determining a baseline hold-down force for the seismic vehicle, wherein the baseline hold-down force is a maximum hold-down force for the seismic vehicle that is relative to a surface having no tilt or roll angle; and
    selecting a value of a hold-down force by calculating a value of an effective hold-down force using the at least two orientation parameters and the baseline hold-down force.

2. The method of claim 1, wherein selecting the value of the hold-down includes selecting a preset hold-down force lower than the baseline hold-down force using the value of the effective hold-down force.

3. The method of claim 1, further comprising calculating the value of the hold-down force using a controller, wherein the controller uses the least two measured orientation parameters to calculate the hold-down force value.

4. The method of claim 1, further comprising reducing a target driving force if the hold down force is below a preset value.

5. The method of claim 3, further comprising generating the hold-down force using a hydraulic source; and controlling the hydraulic source with the controller.

6. The method of claim 1, wherein calculating the value of the hold-down force further comprises using an articulated joint offset of the seismic vehicle.

7. The method of claim 1, further comprising:
    transmitting seismic vehicle information from the seismic vehicle to a control center, wherein the seismic vehicle information includes at least one of: (i) the at least two orientation parameters, and (ii) the selected value of the hold-down force;
    updating a seismic data acquisition database at the control center using the transmitted seismic vehicle information.

8. The method of claim 1, further comprising:
    transmitting from a control center seismic vehicle information to the seismic vehicle, wherein the seismic vehicle information includes an instruction to adjust at least one of: (i) the hold down force, and (ii) a target driving force.

9. The method of claim 1, further comprising:
    determining a range of values for the at least two orientation parameters for the seismic vehicle.

10. The method of claim 9, further comprising:
    imparting seismic energy into a subsurface formation using the seismic vehicle only if the measured at least two orientation parameters are within the determined range of values for the at least two orientation parameters.

11. The method of claim 10, further comprising positioning the seismic vehicle until the seismic vehicle has measured the at least two orientation parameters within the determined range of values for the at least two orientation parameters.

12. The method of claim 1, further comprising:
    imparting seismic energy into a subsurface formation using the seismic vehicle;
    detecting seismic signals using at least one sensor, wherein the seismic signals are reflections of the imparted seismic energy; and
    characterizing the surface or subsurface formation using the detected seismic signals and at least one of: (i) at least one orientation parameter associated with the seismic vehicle from the at least two orientation parameters, and (ii) the hold-down force applied by the seismic vehicle while the seismic energy was imparted.

* * * * *